(12) United States Patent
Davies et al.

(10) Patent No.: US 6,349,600 B1
(45) Date of Patent: Feb. 26, 2002

(54) DEVICE FOR STABLE SPEED DETERMINATION IN MACHINING

(75) Inventors: Matthew A. Davies, Kensington; Brian Dutterer, Westminister; Jon R. Pratt, Clarksburg, all of MD (US)

(73) Assignee: The Government of the United States of America, as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/464,600

(22) Filed: Dec. 16, 1999

Related U.S. Application Data (60) Provisional application No. 60/124,441, filed on Mar. 15, 1999, and provisional application No. 60/136,981, filed on Jun. 1, 1999.

(51) Int. Cl.[7] .................................................. G01N 19/00
(52) U.S. Cl. ............................................. 73/660; 73/104
(58) Field of Search .......................... 73/660, 104, 593, 73/584, 597, 599; 700/174, 177; 340/680, 683

(56) References Cited

U.S. PATENT DOCUMENTS

| | | | |
|---|---|---|---|
| 3,938,626 A | | 2/1976 | Hopkins |
| 3,967,515 A | | 7/1976 | Natchtigal et al. |
| 4,170,103 A | | 10/1979 | Norris et al. |
| 4,386,407 A | * | 5/1983 | Hungerford .................. 364/474 |
| 4,409,659 A | * | 10/1983 | Devine ........................ 364/475 |
| 4,604,834 A | | 8/1986 | Thompson |
| 4,759,243 A | | 7/1988 | Thompson |
| 4,831,365 A | * | 5/1989 | Thomas et al. ................ 73/660 |
| 5,033,340 A | | 7/1991 | Siefring |
| 5,170,358 A | | 12/1992 | Delio |
| 6,038,489 A | * | 3/2000 | Pickles et al. .............. 700/164 |

* cited by examiner

Primary Examiner—Helen Kwok
(74) Attorney, Agent, or Firm—Jagtiani & Associates (57) ABSTRACT

The present invention provides a device and method for determining the stable speeds for a rotating milling tool by non-cuttingly exciting the milling tool, by vibrating the milling tool, and measuring how the milling tool is excited. The present invention also provides a device and method for determining the stable speeds for a lathe tool by non-cuttingly exciting the lathe tool, by vibrating the tool using an excitation device mounted on a rotating lathe test bar, and measuring how the lathe tool is excited.

26 Claims, 7 Drawing Sheets

DEVICE FOR STABLE SPEED DETERMINATION IN MACHINING

CROSS-REFERENCE TO RELATED APPLICATIONS

The present application is based on U.S. Provisional Application No. 60/124,441 filed Mar. 15, 1999 and U.S. Provisional Patent Application No. 60/136,981 filed Jun. 1, 1999, the entire disclosures and contents of which are hereby incorporated by reference.

BACKGROUND OF THE INVENTION

1. Field of the Invention

The present invention relates generally to devices and methods for use with high-speed machining.

2. Description of the Prior Art

During the past decade, there has been a marked increase in the industrial use of high-speed machining technology. In addition, machining centers have been developed which are capable of spindle and slide speeds that are an order of magnitude higher than those available on conventional machining centers. For example, a number of different industrial suppliers have introduced reliable machining centers with slide speeds that approach or exceed 60 meters per minute, accelerations of 10 meters per second squared, and spindles capable of delivering in excess of 30 kilowatts of power to the cutting zone at spindle speeds greater than 30 thousand revolutions per minute. While these new machining centers offer the possibility of much higher material removal rates, markedly improved surface finish, and increased workpiece quality, their use also requires much more technical expertise than conventional machining centers. Regenerative chatter is one of the most difficult phenomena to master in high-speed machining because solutions are often counterintuitive; for example speeding up the spindle or increasing the overhang of the tool may actually diminish the tendency of the system to chatter. This behavior must be made intuitive to the programmers and machinists if high-speed machining centers are to be used to their full potential.

Various methods and devices for identifying, avoiding and controlling, chatter have been developed, such as described in Altintas et al., "Analytical Prediction of Stability Lobes in Milling in *Annals of the CIRP* (1995), 44(1): 357–362; U.S. Pat. No. 3,967,515 to Natchtigal, et al.; U.S. Pat. No. 4,170,103 to Rouch, et al; U.S. Pat. No. 5,033,340 to Siefring; U.S. Pat. No. 4,604,834 to Thompson; U.S. Pat. No. 3,938,626 to Hopkins; U.S. Pat. No. 4,759,243 to Thompson; and U.S. Pat. No. 5,170,358 to Delio. However, these devices and methods may be expensive and may require a substantial amount of expertise to use correctly.

SUMMARY OF THE INVENTION

It is therefore an object of the present invention to provide a device for stable speed determination in machining that does not require cutting tests.

It is another object of the present invention to provide a device for stable speed determination in machining that is suitable for integration with a machine-tool controller.

It is yet another object of the present invention to provide a device for stable speed determination in machining that allows the optimal speeds for a tool to be quickly downloaded and stored for later use.

It is yet another object of the present invention to provide a device for stable speed determination in machining that may be produced cheaply.

It is yet another object of the present invention to provide a device for stable speed determination in machining that may be made small and may be used by those with minimal expertise in machine-tool dynamics.

It is yet another object of the present invention to provide a device for stable speed determination in machining that may be made relatively robust with respect to a machining environment.

It is yet another object of the present invention to provide a device for stable speed determination in machining that may be used in combination with conventional chatter recognition and control schemes and "tool-tuning" strategies.

It is yet another object of the present invention to provide a device for stable speed determination in machining that does not rely on direct quantitative, experimental measurements of frequency response functions (FRFs) of the machine tool structure, and, furthermore, does not rely on curve fitting of such data.

It is yet another object of the present invention to provide a device for stable speed determination in machining that may make measurements on a rotating tool.

According to one aspect, the present invention provides a device for stable speed determination in machining, the device comprising: an excitation means for non-cuttingly exciting a rotating milling tool; and a measuring means for measuring the excitement of the milling tool by the excitation means.

According to a second aspect, the present invention provides a device for stable speed determination in machining, the device comprising: a rotating excitation means for non-cuttingly exciting a lathe tool; and a measuring means for measuring the excitement of the lathe tool by the excitation means.

According to a third aspect, the present invention provides a method for determining at least one stable speed for milling comprising the steps of: rotating a milling tool at a plurality of speeds; non-cuttingly exciting the milling tool; measuring the excitement of the milling tool at the plurality of speeds; determining at least one stable speed for the milling tool based on results from the measurement step.

According to a fourth aspect, the present invention provides: a method for determining at least one stable speed for lathe cutting comprising the steps of: rotating a lathe test bar at a plurality of speeds using a lathe spindle; non-cuttingly exciting a lathe tool using an excitation means mounted in the lathe test bar to measure the excitement of the lathe tool at the plurality of speeds; determining at least one stable speed for the lathe tool based on results from the measurement step.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

It is advantageous to define several terms before describing the invention. It should be appreciated that the following definitions are used throughout this application.

Definitions

For the purposes of the present invention, the term "machine-tool" includes machines employing cutting tools such as: milling tools, lathe tools, etc. For the purposes of the present invention, the term "machining" refers to methods employing machine-tools.

Figure 6:
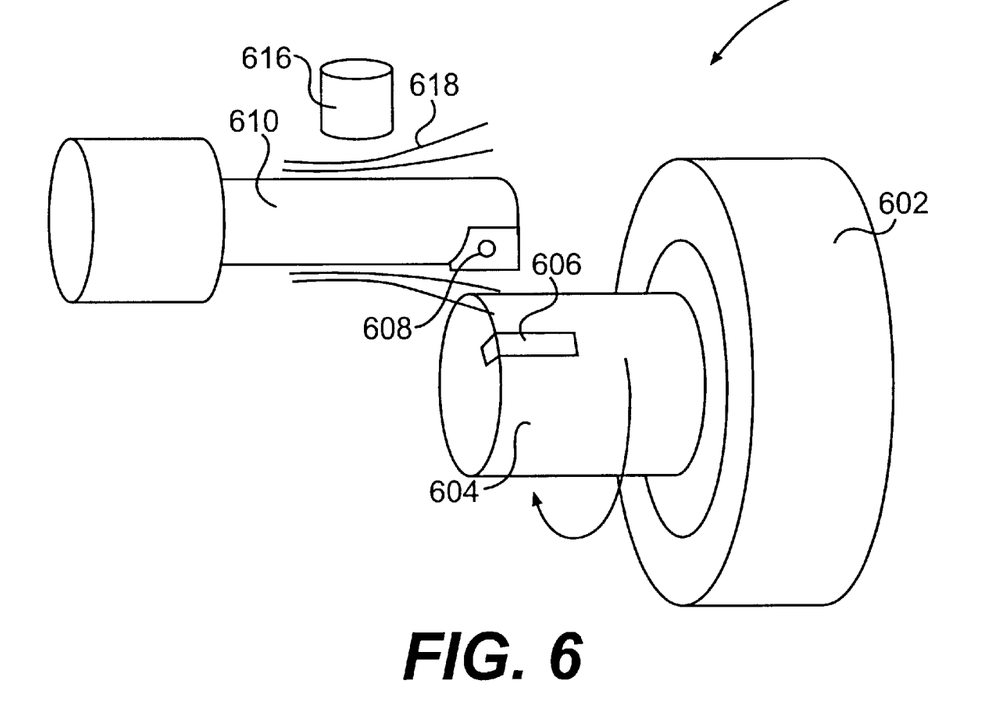
FIG. 6 is a schematic view of a first device of the present invention for use with a lathe spindle.
Figure 7:
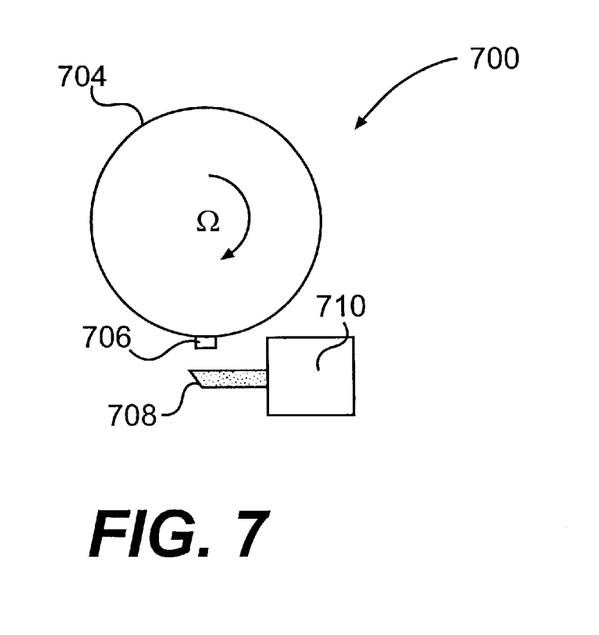
FIG. 7 is a planar schematic view of a second device of the present invention for use with a lathe spindle.

For the purposes of the present invention, the term "lathe tool" refers to any cutting tool, generally fixed, for cutting material that rotates relative to the cutting tool. A lathe tool may, for example, be a removable insert mounted on a boring bar, such as shown in the embodiment of FIG. 6, or a fixed blade, such as shown in the embodiment of FIG. 7.

For the purposes of the present invention, the term "milling tool" refers to a cutting tool that rotates relative to the material the cutting tool cuts. For the purposes of the present invention, the term "milling tool" also includes "milling test bars" used in a device of the present invention.

Figure 8:
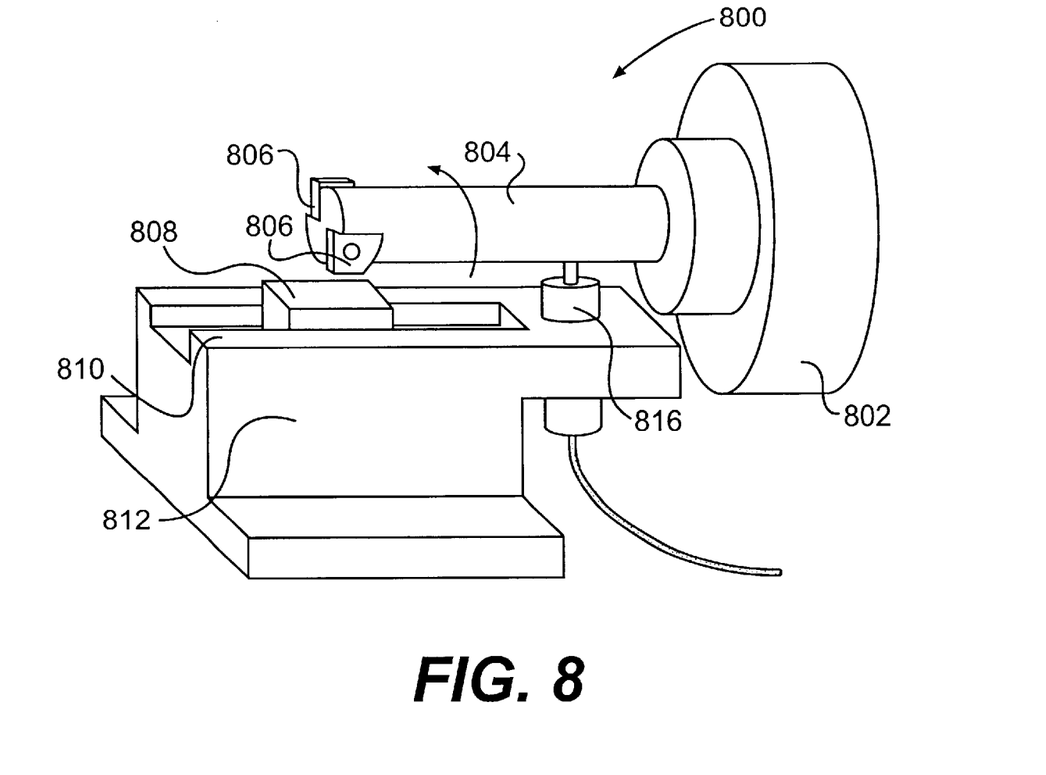
FIG. 8 is a schematic view of a third device of the present invention for use with a milling spindle.
Figure 9:
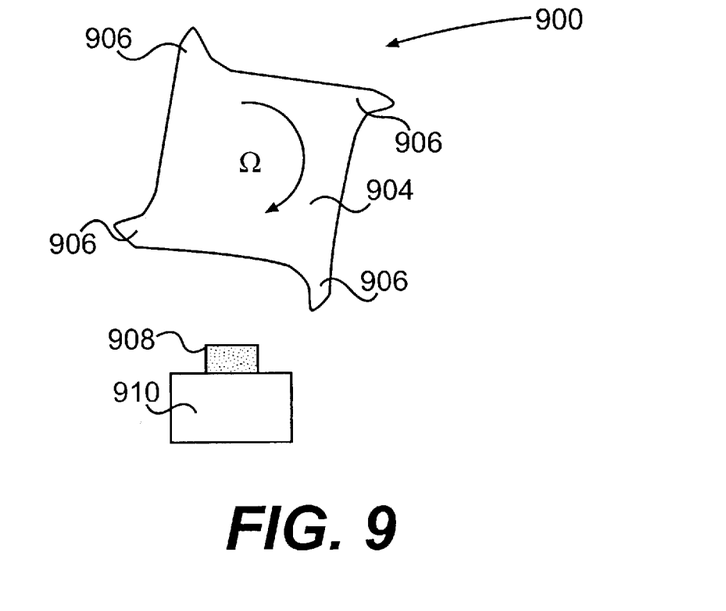
FIG. 9 is a planar schematic view of a fourth device of the present invention for use with a milling spindle.

For the purpose of the present invention, the term "flute" refer to one or more parts of a cutting tool that cut a piece of material as the milling tool rotates. A flute may be a removable insert, such as shown in the embodiment of FIG. 8, or may be a cutting projection that is part of a unitary milling tool, such as shown in the embodiment of FIG. 9. For the purposes of the present invention, the term "flute" also includes objects, such as an edge of a flattened milling test bar, that simulate a flute.

For the purposes of the present invention, a "spindle" refers to a device for rotating a milling tool, a lathe test bar, a milling test bar, a piece of material mounted on a lathe, etc.

For the purposes of the present invention, the term "depth/width" of cut refers to the dimension of the chip produced by a cutting operation, measured perpendicular to the forward velocity of the tool cutting edge produced by the rotation of the spindle. In milling this is typically the "axial depth-of-cut" while in turning, i.e. when using a lathe tool, it is typically referred to as simply the "depth-of-cut".

For the purposes of the present invention, the term "lathe test bar" refers to any object rotated by a lathe spindle and used to generate an excitation force between the lathe spindle and a lathe cutting tool. Generally, a lathe test bar is cylindrical in shape, but the lathe test bar of the present invention may have various shapes.

For the purposes of the present invention, the phrase "non-cuttingly exciting a milling tool" refers to using an excitation device, such as a magnet, jet of air, jet of gas, impact hammer etc. to vibrate the milling tool in a particular back and forth direction, without the milling tool having to cut a piece of material. The milling tool may be either pulled towards an excitation device to become excited or may be pushed away from an excitation device to become excited.

For the purposes of the present invention, the phrase "non-cuttingly exciting a lathe tool" refers to using an excitation device, such as a magnet, jet of air, jet of gas, impact hammer etc. mounted in a lathe test bar to vibrate a lathe tool in a particular back and forth direction, without the lathe test bar being cut by the lathe tool. The lathe tool may be either pulled towards the excitation device to become excited or may be pushed away from the excitation device to become excited.

Figure 3:
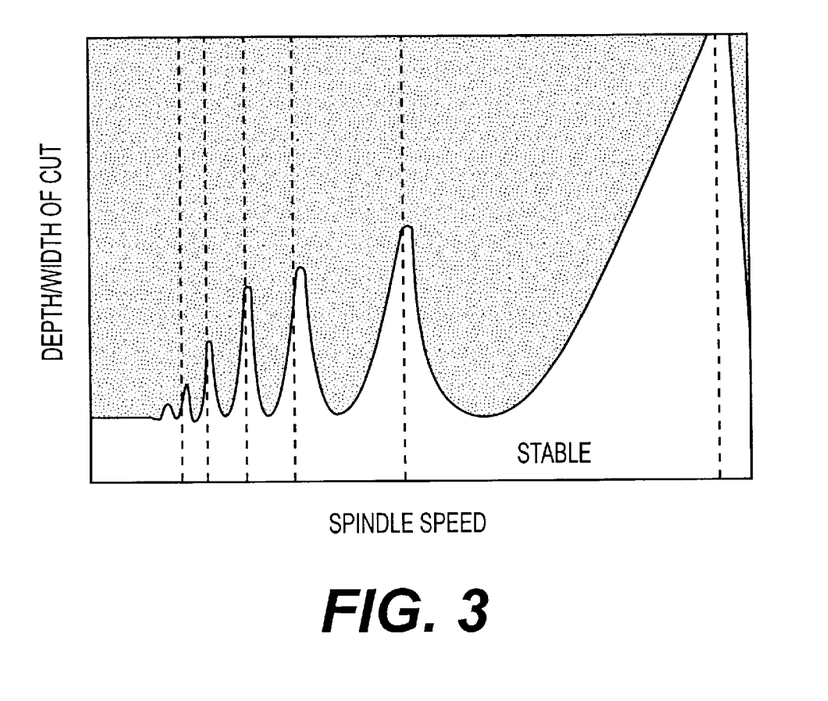
FIG. 3 is a chart showing the regenerative stability behavior for a machine-tool system during cutting where the vertical axis represents the axial depth of cut for a milling operation of the width of the cut during a turning operation, the horizontal axis represents the spindle speed, the gray area represents combinations of these parameters likely to produce regenerative chatter and the white area represents combinations of parameters that are unlikely to produce regenerative chatter.

For the purposes of the present invention, with respect to a milling tool, the term "stable speed" refers to a speed at which a milling tool is the most immune to the effects of regenerative chatter when compared to nearby cutting speeds, as shown, for example, by dashed lines in FIG. 3.

For the purposes of the present invention, with respect to a lathe tool, the term "stable speed" refers to a speed at which a lathe spindle rotates a piece of a material so that the lathe tool operates substantially free of chatter when cutting the rotating piece of material.

For the purposes of the present invention, the term "microphone" refers to any device for sensing sound properties.

For the purposes of the present invention, the term "high-speed machine-tool" refers to a machine-tool rotating at a speed of at least 8000 rpm.

For the purposes of the present invention, a "power spectrum" is a representation of the energy content of a signal as a function of frequency. FIGS. 5B and 5C are examples of power spectra. For the purposes of the present invention, the term "dominant component of a power spectrum" is a component or peak where the power in the signal at that frequency exceeds the noise floor of a typical force measurement made on a typical high-speed machine-tool.

Description

Figure 1:
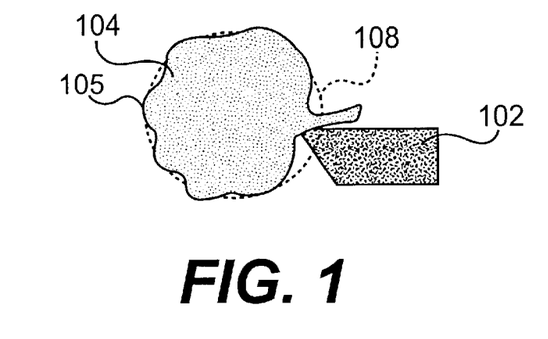
FIG. 1 is a schematic planar cross-sectional view of a conventional lathe tool in operation.
Figure 2:
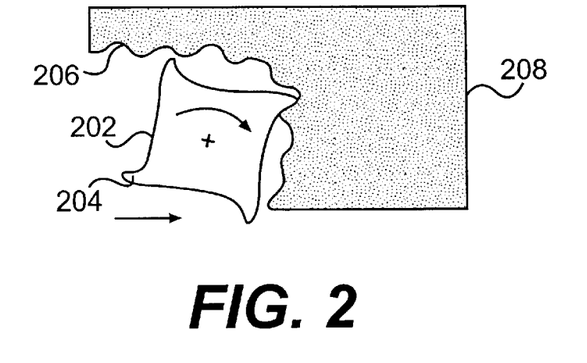
FIG. 2 is a schematic planar cross-sectional view of a conventional milling tool in operation.

Regenerative chatter in machining is a self-excited vibration of the workpiece and/or tool that results in poor surface finish, increased rates of tool wear and potentially irreparable damage to the machine or the workpiece. In high-speed machining operations, regenerative chatter is often the dominant factor limiting the attainable rates of material removal. Regenerative chatter is caused by the force-feedback that occurs when a previously cut surface is re-cut in a subsequent machining operation. For example, when regenerative chatter occurs on a lathe, the previously cut surface is re-cut during each spindle rotation as illustrated in FIG. 1 in which a lathe tool 102 creates cuts 104 in a rotating material 106 mounted on a lathe 108. In milling, each flute of a milling tool cuts a surface that was produced by the preceding flutes as illustrated in FIG. 2 in which a rotating milling tool 202 includes flutes 204 that create cuts 206 in a material 208. This phenomenon gives rise to stability behavior such as illustrated in FIG. 3.

Currently, devices for identifying, avoiding, and controlling chatter fall into one of two general categories: (1) devices that provide additional forces either through passive or active means to the machine and tool combination to reduce or eliminate chatter for a given set of cutting conditions; or (2) devices that take data during the machining process and attempt to make corrections in process parameters to guide the machine to stable cutting conditions. The first type of device uses active or passive means to vary the shape/location of the stability curves. The second type of device operates during machining and actively corrects the machining conditions to avoid chatter. One system of the second type is described in U.S. Pat. No. 5,170,358 to Delio, the entire disclosure and contents of which are hereby incorporated by reference. This patent describes a chatter recognition and control (CRAC) system, currently sold as a commercial package, that uses a microphone to monitor the cutting conditions and is interfaced with the machine-tool controller so that it may adjust machining parameters in real-time to find chatter-free machining conditions. However, systems such as this may be expensive and may require a substantial amount of expertise to operate correctly. Thus, the current systems for avoiding chatter are best suited for process engineers in sophisticated industrial shops. Such systems are not particularly well suited for use by a machinist in a small job shop who has little or no expertise in machine-tool dynamics.

The device of the present invention takes a different approach to the problem of regenerative chatter than previous devices. The device of the present invention provides information to the machinist about the dynamics of a machine-tool system so that intelligent decisions about machining conditions may be made. The device of the present invention may also be used in conjunction with either of the two types of devices mentioned above. In addition, the device of the present invention may be manufactured at a small fraction of the cost of more complicated systems.

The device of the present invention takes advantage of the fact that stable spindle speeds are those that produce the least phase shift between the current cutter oscillations and the wave left during the previous cut, leading to a non-varying chip thickness. To first order, these stable spindle speeds, indicated by dashed lines in FIG. 3, are dependent only on the dynamics of the structural loop including the tools, the machine structure and the workpiece. For a rigid workpiece, the most stable spindle speeds are independent of the material being cut. The correct identification of these stable speeds is critical for efficient use of new high-speed machining techniques, often leading to an order of magnitude higher metal removal rate than could be obtained under less optimal conditions.

One of the purposes of the device of the present invention is to provide a simple, low-cost method for rapidly determining the most stable spindle speeds for a particular cutting tool/machine combination without the need for cutting tests. The simplicity of the device is possible because it does not attempt to determine the stable depth/width of a cut. This is usually determined by a machinist through trial and error. However, because of the device's simplicity, the device may remain on a machine-tool and is comparable to a tool-length sensor in ease of use. For this reason, the device of the present invention is extremely suitable for use in smaller job shops where tool configurations (such as overhang and hence stable speeds) are changed to suit each new job.

The device of the present invention allows for stable spindle speeds to be determined without the need for cutting tests, yet the measurements made using the device of the present invention are done using a rotating milling tool or lathe spindle rather than on a static non-rotating machine. The device of the present invention may also be produced relatively cheaply and may be made small. In addition, the device of the present invention may be used in conjunction with other chatter recognition and control devices as well as "tool-tuning" strategies. The device of the present invention is also not restricted to identifying a limited number of resonances for a machine-tool, but may identify any resonant frequency as a stable speed for the machine-tool.

The device of the present invention uses a non-contact force actuator to drive a spindle for a machine-tool or a spindle for a workpiece with a train of impulsive forces having a known, time-varying frequency and to identify the speeds least likely to produce chatter (regenerative vibrations). Such a reduction may be accomplished using the device of the present invention in real time without the need for cutting tests.

In the method of the present invention, a spindle and a non-contact magnetic force actuator are used to produce a time-varying impulse train. This impulse train has significant energy at the spindle speed and its harmonics. As the spindle speed is ramped up from zero to the maximum speed, those speeds that maximize the dynamic response of the tool are the speeds that minimize regenerative chatter. The spindle may either be a spindle designed to produce the rotation of a cutting tool or a spindle designed to produce rotation of a workpiece.

The functioning of the device of the present invention relies on empirical, theoretical and numerical observations that to first order, the stable speeds for a particular machine-cutting tool configuration are independent of the material being cut. Thus, while changes in workpiece material will cause a stability chart, such as that shown in FIG. 3 to translate parallel to the depth/width-of-cut axis, they will not result in translation parallel to the spindle speed axis. Therefore, the most stable spindle speeds remain fixed as long as the dynamics of the machine-tool system is unchanged. This result may be theoretically demonstrated using well-established models for machine-tool chatter, as described in Tlusty, J. "High-speed machining" in *Annals of the CIRP* (1993), 42(2): 733–738; Tlusty, et al., "Techniques for the Use of Long Sender End Mills in High-speed Milling" in *Annals of the CIRP* (1996), 45(1): 393–396; Davies, M. A., et al., "On the dynamics high-speed milling with long slender endmills" in *Annals of the CIRP* (1998), 47(1); Davies et al., "High-speed machining" in *McGraw Hill 1999 Yearbook of Science and Technology* (McGraw Hill: 1998); and Altintas et al. "Analytical Prediction of Stability Lobes in Milling" in *Annals of the CIRP* (1995), 44(1): 357–362; the entire contents and disclosures of which are hereby incorporated by reference.

The preferred spindle speeds to avoid regenerative chatter approximately satisfy the following equation $$\Omega_i = \frac{f}{iN} \quad (1)$$

where i is the integer index and is equal to 1, 2, 3, etc.; f is the resonant frequency of a flexible mode of the machine-tool system in Hertz, N is the number of the flutes for a milling operation and N=1 for a turning operation. There are an infinite number of stable speeds that get lower and more densely packed as the integer index i is increased. The stable regions become tall and wider as i approaches 1, and for practical purposes the lowest attainable i values are the most useful stability regions. This has led to one much-used definition of "high-speed machining": operation at spindle speeds that are a significant fraction of f/N. Equation (1) may be considered the conditions for resonance for a tool given a harmonic exciting at $\Omega_i$. When the resonance conditions are satisfied, a tool has the most favorable phase relationship for stability.

Figure 4A:
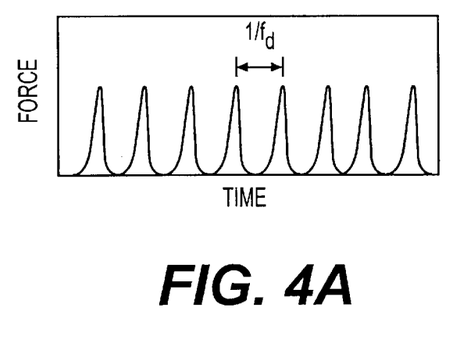
FIG. 4A is a schematic diagram of impulsive driving force in the time domain.
Figure 4B:
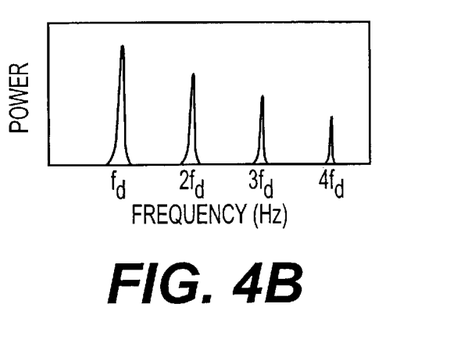
FIG. 4B is a schematic diagram of impulsive driving force in the frequency domain showing that at least four of the harmonics of the lowest frequency component are easily discernable and therefore have more energy content than nearby frequency components.

From Equation (1), it is apparent that if a tool tip is driven by a force with suitable harmonic content, sweeping the frequency of the forcing function will produce large responses of the tool at frequencies corresponding to the most stable spindle speeds. This situation is diagrammed in FIGS. 4A, 4B, 5A, 5B, and 5C. FIGS. 4A and 4B show an impulsive driving force with frequency $f_d$ in the time and frequency domains, respectively. The force has a large energy content at $f_d$ and three harmonics of $f_d$: $2f_d$, $3f_d$, and $4f_d$. For a perfect impulsive force, the energy content at all harmonics is equal. However, for imperfect impulsive loading, the harmonic content drops to zero with increased frequency. If a machine-cutting tool system with the response function shown in FIGS. 5A, 5B, and 5C is driven by the force shown in FIGS. 4A and 4B, the machine-cutting tool system's response will be maximized for cases where $f_d$ satisfies the following relationship:

$$f_d = \frac{f}{i} \quad (2)$$

Figure 5A:
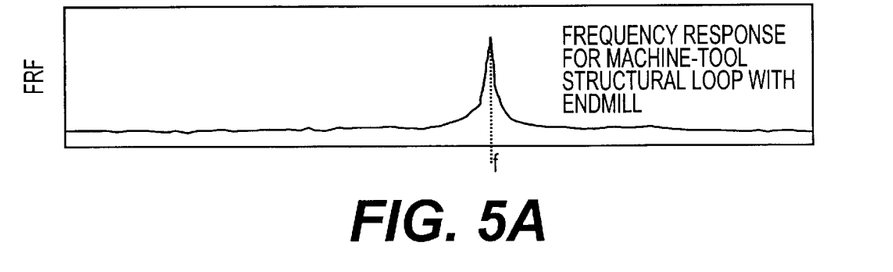
FIG. 5A is a schematic diagram of Frequency Response for a machine-tool structural loop defining the relative amplitude of the relative motion between the cutting tool and the workpiece as a function of the driving frequency.
Figure 5B:
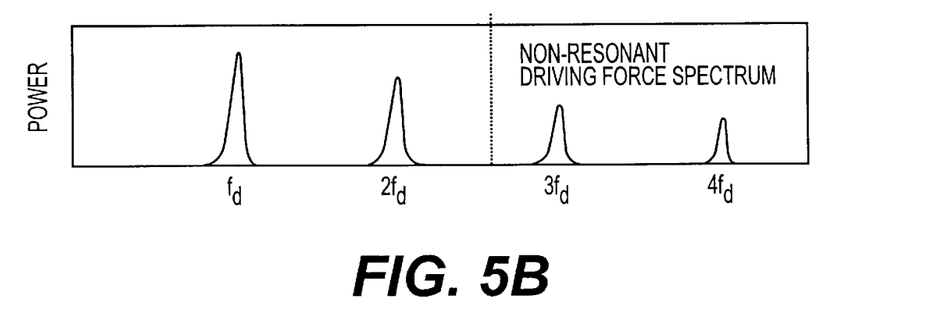
FIG. 5B is a schematic diagram of a Non-resonant Driving Force Spectrum.
Figure 5C:
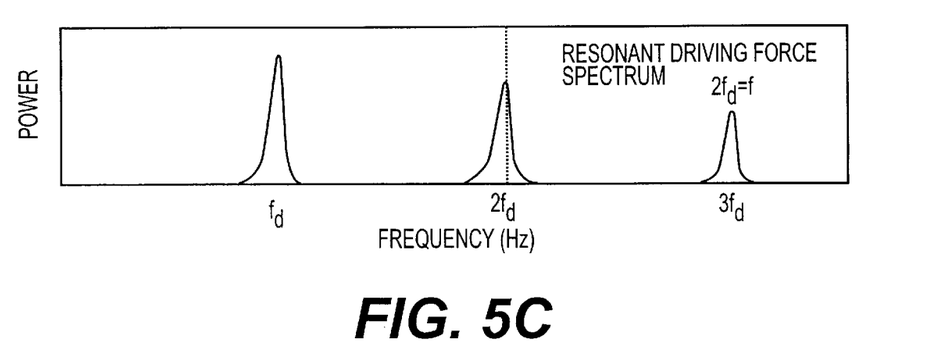
FIG. 5C is a schematic diagram of a Resonant Driving Force Spectrum.

This situation is shown in FIGS. 5A, 5B, and 5C for the case where i is 2. If $f_d = \Omega_i N$, Equations (1) and (2) are identical. This will be true if the spindle of the machine-tool and a non-contact force actuator are used to produce an impulsive force at a frequency $N\Omega$ and then $\Omega$ is swept over spindle speeds in a predetermined range of interest. This is shown graphically by the fact that the peak for the harmonic $2f_d$ of FIG. 5C lines up with the peak for f, the resonant frequency of a flexible mode of the machine-tool system, in FIG. 5A.

Although ideally a spindle would be operated at a speed where the peak for $f_d$ would correspond with the peak for f, the resonant frequency of a flexible mode of the machine-tool system, it may be difficult to operate a spindle at a high enough speed so that the peaks for $f_d$ and for f correspond. In such situations, the spindle can be operated at one of the harmonics of $f_d$, as is illustrated by FIG. 5C.

FIG. 6 shows an embodiment of a stable speed determination device of the present invention for use with a lathe tool and a lathe spindle. In FIG. 6, a stable speed determination device 600 of the present invention is used with a lathe spindle 602. Speed determination device 600 is comprised of a balanced lathe test bar 604, a magnet 606, and a removable turning insert 608 mounted on a boring bar 610. Turning insert 608 is made from a material, such as steel or tungsten carbide, capable of being acted on by a magnet. As magnet 606 comes into close proximity to turning insert 608, a large force is produced, pulling turning insert 608 and boring bar 610 towards lathe test bar 604. Preferably the peak force is on the order of about 4 to 15 N in order to induce suitable but not prohibitively large vibrations. Thus, as the speed of lathe spindle 602 is varied, boring bar 610 and turning insert 608 will be excited most when the resonance conditions shown in equation (1) and in FIGS. 4A, 4B, 5A, 5B, 5C are met. A microphone 616 senses the magnitude of vibrations 618 of boring bar 610 caused by the interaction of magnet 606 with turning insert 608.

FIG. 7 shows another embodiment, in schematic form, of a stable speed determination device of the present invention for use with a lathe tool and a lathe spindle. In FIG. 7, a stable speed determination device 700 of the present invention is used with a lathe spindle (not visible). Speed determination device 700 is comprised of a balanced lathe test bar 704, a magnet 706, and a fixed lathe blade 708 mounted on a boring bar 710. Lathe blade 708 is made from a material, such as steel or tungsten carbide, capable of being acted on by a magnet. As magnet 706 comes into close proximity to lathe blade 708, a large force is produced, pulling lathe blade 708 and boring bar 710 towards lathe test bar 704. Preferably the peak force is on the order of about 4 to 15 N in order to induce suitable but not prohibitively large vibrations. Thus, as the speed of the lathe spindle is varied, boring bar 710 and lathe blade 708 will be excited most when the resonance conditions shown in equation (1) and in FIGS. 4A, 4B, 5A, 5B, 5C are met. A microphone may be used to sense the magnitude of vibrations (not shown) of lathe blade 708 caused by the interaction of magnet 706 with lathe blade 708.

FIG. 8 shows an embodiment of a stable speed determination device of the present invention for use with a milling tool and a milling spindle. In FIG. 8, a stable speed determination device 800 of the present invention is used with a milling spindle 802. Speed determination device 800 is comprised of a solid tool shank 804, two milling inserts 806 mounted on solid tool shank 804, and a magnet 808 mounted in a mounting assembly 810. Mounting assembly 810 is mounted on a dynamometer 812. Milling inserts 806 are each made from a material, such as steel or tungsten carbide, capable of being acted on by a magnet. As each of milling inserts 806 comes into close proximity to magnet 808, a large force is produced, pulling the nearby milling insert 806 and solid tool shank 804 towards magnet 808. Preferably the peak force is on the order of about 4 to 15 N in order to induce suitable but not prohibitively large vibrations. Thus, as the speed of lathe spindle 802 is varied, solid tool shank 804, on which milling inserts 806 are mounted, will be excited most when the resonance conditions shown in equation (1) and in FIGS. 4A, 4B, 5A, 5B, 5C are met. A capacitance probe 816 senses the magnitude of vibrations (not shown) of solid tool shank 804 caused by the interaction of magnet 808 with milling inserts 806.

Although a dynamometer is shown as part of the device of FIG. 8 and it may be desirable to use a dynamometer to measure the performance of the device of the present invention, a dynamometer is not necessary to the functioning of the device of the present invention.

FIG. 9 shows another embodiment of a stable speed determination device of the present invention for use with a milling tool and a milling spindle. In FIG. 9, a stable speed determination device 900 of the present invention is used with a milling spindle (not shown). Speed determination device 900 is comprised of an endmill 904 having four milling flutes 906, and a magnet 908 mounted in a mounting assembly 910. Endmill 904 and milling flutes 906 are made from a material, such as steel or tungsten carbide, capable of being acted on by a magnet. As each of milling flutes 906 comes into close proximity to magnet 908, a large force is produced, pulling the nearby milling flute 906 and endmill 904 towards magnet 908. Preferably the peak force is on the order of about 4 to 15 N in order to induce suitable but not prohibitively large vibrations. Thus, as the speed of the milling spindle is varied, endmill 904 will be excited most when the resonance conditions shown in equation (1) and in FIGS. 4A, 4B, 5A, 5B, 5C are met. A capacitance probe (not shown) senses the magnitude of vibrations (not shown) of endmill 904 caused by the interaction of magnet 908 with milling flutes 906.

When the device of the present invention is used with a lathe spindle, the turning insert or lathe tool is preferably made from a material, such as a ferrous metal, which may be acted on by the magnetic actuator.

When the device of the present invention is used with a milling spindle, the milling inserts, the milling flutes or the entire milling tool is made from a material, such as a ferrous metal, which may be acted on by the magnetic actuator.

Although only a few types of lathe tools and milling tools are shown in FIGS. 6, 7, 8 and 9 for use with the device of the present invention, the device of the present invention may be used with many kinds of lathe tools and milling tools.

Although only a few types of sensors are shown for use with the device of the present invention, it should be understood that various kinds of sensors may be used with the device of the present invention. In general, the function of the sensor is to discern peaks in the response of a lathe tool or a milling tool. Types of sensors that may be used for this purpose include not only capacitance sensors and microphones, but eddy-current sensors; optical vibration sensors; etc.

Although a permanent magnet is used as a non-contact actuator in the devices of the invention shown in FIGS. 6, 7, 8, and 9 above, the non-contact actuator of the present invention may also be an electromagnet.

Also, the device of the present invention is not limited to magnet-microphone arrangement of the embodiment of the present invention shown in FIG. 6 or the magnet-capacitance probe arrangement of the embodiment of the present invention shown in FIG. 8. The device of the present invention may be constructed with any actuator capable of producing an applied force with an impulsive nature such that the input force contains significant energy at the driving frequency and some number of its harmonics. The number of discernible harmonics is important, because this number determines the total number of stable speeds that can be identified. Actuators that may produce an appropriate force behavior include: magnets, thin high-pressure fluid or gas jets; electrostatic actuators; etc.

The device of the present invention also contemplates adding a load cell to the force actuator of a machine-tool structure to better quantify the input force. In addition, the device of the present invention contemplates adding a calibrated displacement sensor to quantitatively measure tool deflections. Such a sensor may be calibrated in situ by using the inherent position capability of the machine-tool, thereby avoiding difficulties with different tool geometries.

As the market for high-speed machining grows, the need for devices for stable speed determination is expected to grow commensurately. For example, Weiss Spindles has estimated that after the current period of rapid development in high-speed machine components, the maximum spindle speeds on a substantial portion of CNC (Computer Numerically Controlled) machine-tools will be approximately 25000 rpm, and this company has focused most of their development on developing high-powered spindles in this speed range. A device such as the device of the present invention would be extremely useful on machines of this type, since many of the modes of common machine-tool combinations have frequencies such that large stable regions are attainable with spindle speeds of 10000 rpm or more. For example, a two flute tool with a modal frequency of 1500 Hz produces large stable speeds at 11250 rpm, 15000 rpm, 22500 rpm, and 45000 rpm.

Preferably, the forces generated in the device of the present invention represent a pure periodic impulse train. When a pure periodic impulse train is achieved, energy content increases in the driving force at the harmonics and makes the peaks in the rms-amplitude curve more evident. In addition, when the forces represent a pure periodic impulse train, a larger number of stable speeds may be identified without degrading performance. For example, it has been shown that by using an iron flux concentrator with a rare earth permanent magnet, the harmonic content may be increased substantially. One dynamometer test has shown energy content at seven harmonics each of which were significantly above the noise floor.

Preferably, the device of the present invention is made robust in a machine-tool environment. To accomplish this goal, the device of the present invention may include an enclosure and include tool-vibration sensors that are insensitive to a dirty machine tool environment.

The device of the present invention may be used with milling tools and lathe tools, and lathe test bars of various diameters. The device may be particularly advantageously used with long slender endmills and boring bars used to mill or turn deep pockets with small corner radii. Typical dimensions of these boring bars and endmills are between 3 mm to 30 mm in diameter and have lengths of 40 mm to 150 mm.

Preferably, the device of the present invention may accommodate both high-speed steel and solid tungsten carbide endmills. Tungsten carbide is magnetic, but the forces generated between a tungsten carbide tool and a magnet used as an excitation device are less than those generated on a high-speed steel tool.

EXAMPLE

A test set-up 1000 was developed to test the effectiveness of the device of the present invention in a milling environment. Test set-up 1000 is used with a milling spindle 1002 which rotates a milling test bar 1004. Milling test bar 1004 includes a flattened end 1006 that has two edges 1008 that simulate the two flutes on a conventional milling tool. A permanent magnet 1012 is mounted in a mounting assembly 1014 made from an aluminum block. Mounting assembly 1014 is mounted on a 3-axis piezoelectric dynamometer 1016. As can be seen from FIG. 10, test set-up 1000 resembles the milling tool device of the present invention shown in FIG. 8, with milling test bar 1004 being substituted in place of the milling tool of the embodiment shown in FIG. 8. Dynamometer 1016 is mounted to a pallet (not shown) of a horizontal, four axis high-speed milling center with a maximum spindle speed of 20,000 rpm.

Figure 10:
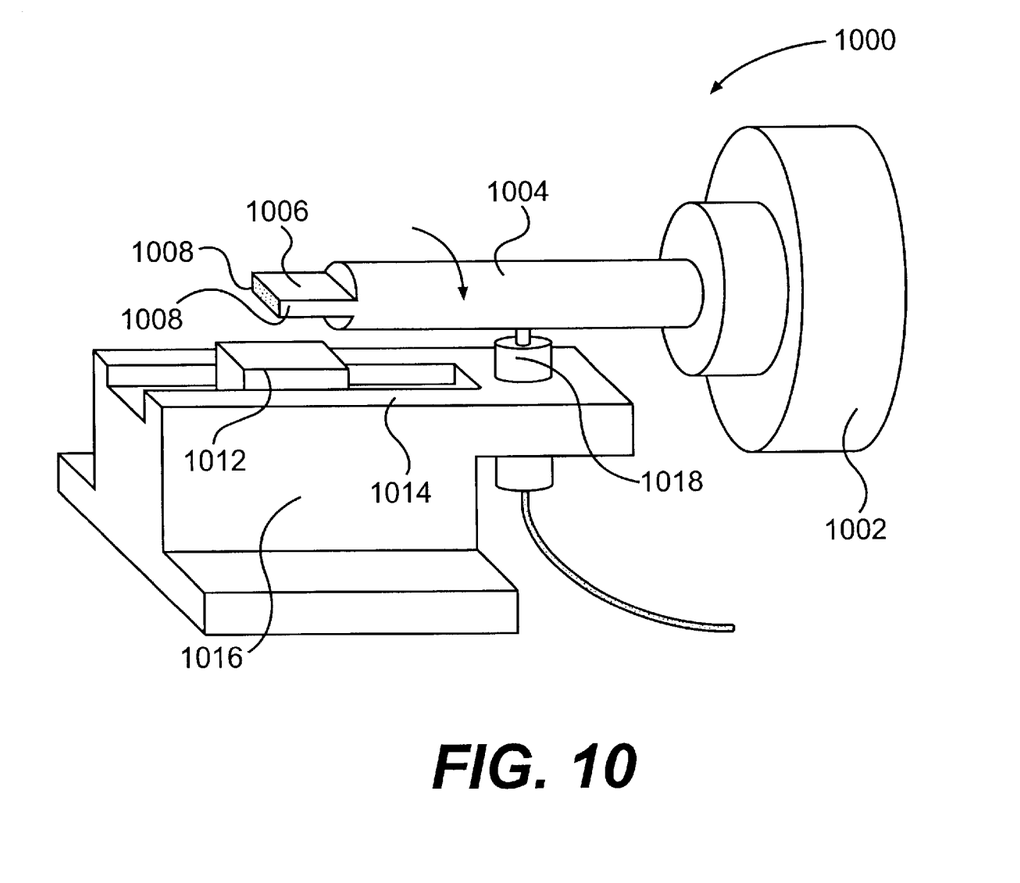
FIG. 10 is a schematic view of a test implementation of the device of the present invention of a high-speed milling machine that utilizes a magnet to generate the excitation force, a capacitance probe to measure the relative vibration of a steel milling test bar designed to simulate a milling cutter.
Figure 11:
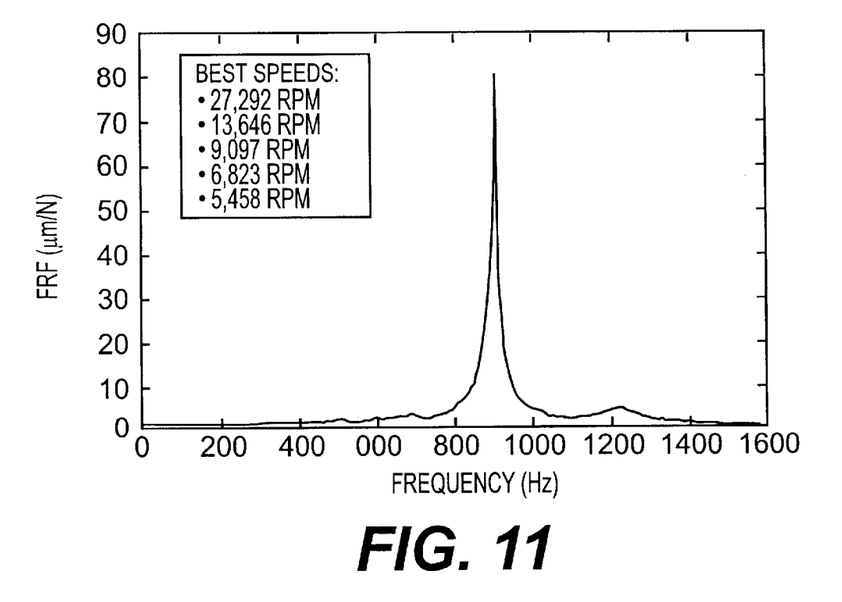
FIG. 11 is a diagram of frequency response function (FRF) for the milling test bar of FIG. 10 and the five most stable cutting speeds for a milling tool having two flutes.

The milling test bar was 12.5 mm diameter, had a clamped length of 114.3 mm and was constructed of high-speed steel. Flats were ground on the milling test bar to simulate the flutes of an endmill or the inserts of a boring bar. The flat sections of the milling test bar were ground on the end of the milling test bar to simulate the flutes of a milling tool. A capacitance probe 1018 was used to measure the dynamic response of the milling test bar. This information was then used to determine the most stable speeds for the test bar. The measured Frequency Response Function (FRF) for displacement of the end of the rod in response to an applied force at the end of the rod is given in FIG. 11. The peak frequency of the response is approximately 905 Hz. The five most stable speeds for this milling test bar were calculated to be: 5458 rpm; 6823 rpm; 9097 rpm; 13646 rpm; and 27292 rpm.

Figure 12A:
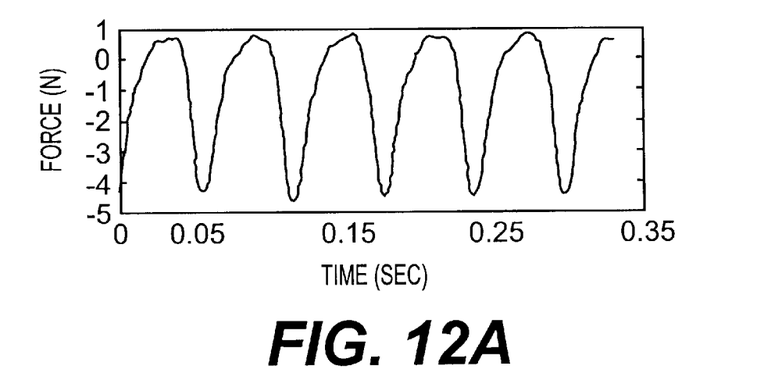
FIG. 12A is a diagram of forces on the milling test bar of FIG. 10 measured at 500 rpm with a minimum clearance of 2 mm in the time domain.
Figure 12B:
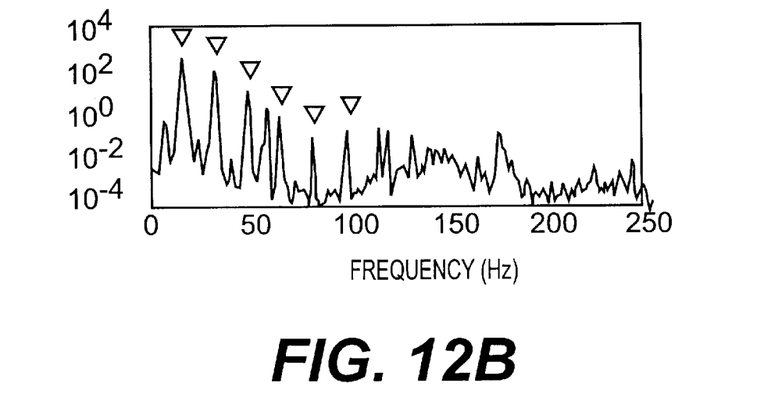
FIG. 12B is a diagram of forces on the milling test bar of FIG. 10 measured at 500 rpm with a minimum clearance of 2 mm in the frequency domain.

The milling test bar was then positioned so that the simulated flutes, the two edges of the flat portion of the rod, passed within 2 mm of the magnet when the flat portion of the rod was aligned vertically. The spindle was rotated at a constant speed of 500 rpm and the forces were measured using the dynamometer. A sample of the measured forces is shown in FIG. 12A (in the time domain) and in FIG. 12B (in the frequency domain). The first six harmonics are indicated by black triangles in FIG. 12B. However, only the first three harmonics are significantly above the noise dominated by harmonics of 60 Hz.

Figure 13:
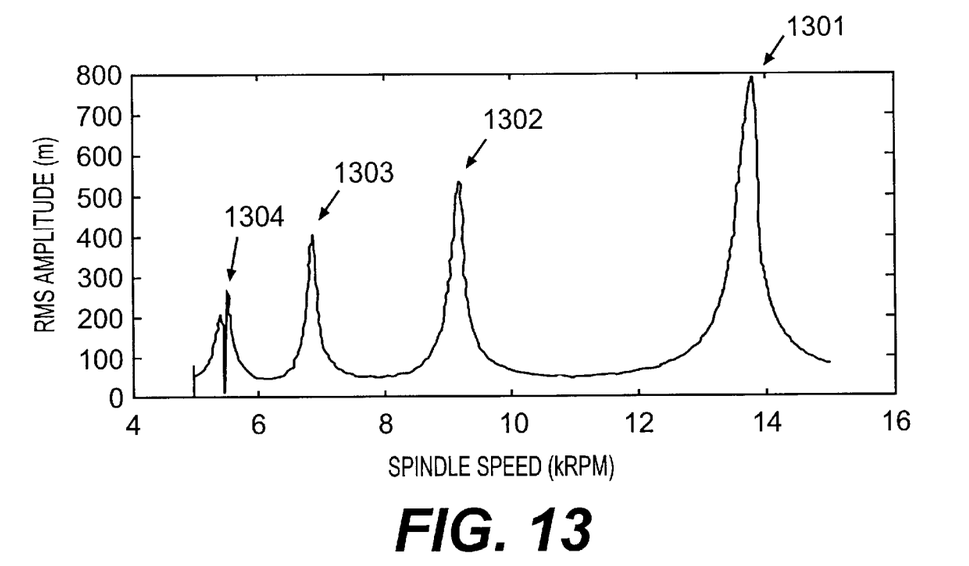
FIG. 13 is a diagram of a numerical simulation of the device behavior showing the root mean square (RMS) amplitude of the milling test bar of FIG. 10 as a function of spindle speed.

The FRF of the milling test bar was then fit with a single degree-of-freedom simple harmonic oscillator model (mass 0.222 kg), damping ratio 0.0087 and a natural frequency of 5686 $s^{-1}$. The response of the system to a periodic, purely impulsive (delta function) load with an amplitude of 0.005 N-s (e.g. 5 N force for a millisecond) ramping frequency. FIG. 13 shows a plot of root mean squared amplitude for this simulation assuming a twice per revolution impulsive load (N=2) for a spindle speed sweep of 5000 rpm to 15000 rpm in ten seconds. The maxima in the root mean squared amplitudes indicate all of the stable speeds for the milling test bar in this range. The locations of peaks 1301, 1302, 1303, and 1304 indicate four best speeds: peak 1304 between 5000 and 6000 rpm; peak 1303 between 6000 and 7000 rpm; peak 1302 slightly greater than 9000 rpm; and, peak 1301 slightly less than 14000 rpm. Peak 1301 corresponds to where $f_d=f$, peak 1302 corresponds to where $2f_d=f$, peak 1303 corresponds to where $3f_d=f$, and peak 1304 corresponds to where $4f_d=f$. The lowest stable speed, at peak 1304, appears to have a double peak, likely due to the effect of the initial conditions. However, in general, the peaks in the rms amplitude of the response of the milling test bar correspond closely to the expected most stable cutting speeds.

Figure 14:
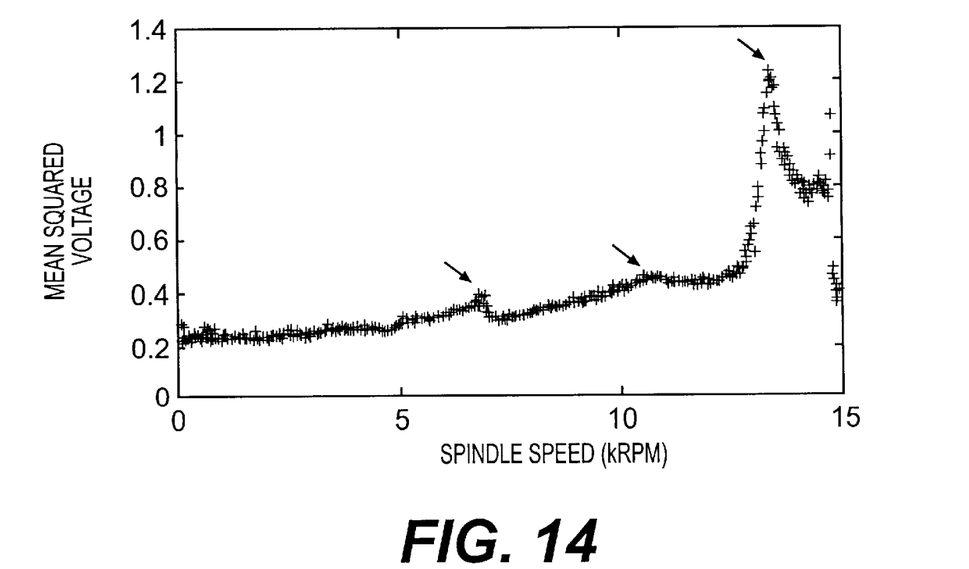
FIG. 14 is a diagram of experimental results showing the mean squared voltage (MSV) amplitude of the milling test bar of FIG. 10 as a function of spindle speed.

FIG. 14 shows the mean squared voltage from the capacitance probe as a function of spindle speed for a milling test bar for a sweep in spindle speeds from zero to 15000 rpm in 80 seconds. Three peaks are evident: (1) between 6000 rpm and 7000 rpm; (2) between 10000 rpm and 11000 rpm; and (3) between 13000 rpm and 14000 rpm. The first and third peaks agree very well with the expected values, while the second one is somewhat higher than expected and the second peak is not as immediately evident as the other two.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device for stable speed determination in machining, said device comprising:
   an excitation means for non-cuttingly exciting a rotating milling tool; and
   a measuring means for measuring the excitement of the rotating milling tool by said excitation means.

2. The device of claim 1, wherein said excitation means comprises a magnet.

3. The device of claim 1, wherein said measuring means comprises a capacitance sensor.

4. The device of claim 1, wherein said measuring means comprises a microphone.

5. The device of claim 1, further comprising said milling tool mounted in a position for being excited by said excitation means.

6. A device for stable speed determination in machining, said device comprising:
   a rotating excitation means for non-cuttingly exciting a lathe tool; and
   a measuring means for measuring the excitement of the lathe tool by said excitation means.

7. The device of claim 6, wherein said excitation means comprises a magnet mounted in a lathe test bar.

8. The device of claim 6, wherein said measuring means comprises a capacitance sensor.

9. The device of claim 6, wherein said measuring means comprises a microphone.

10. The device of claim 6, further comprising said lathe tool mounted in a position for being excited by said excitation means.

11. A method for determining at least one stable speed for milling comprising the steps of:
    rotating a milling tool at a plurality of speeds;
    non-cuttingly exciting the milling tool;
    measuring the excitement of the milling tool at the plurality of speeds; and
    determining at least one stable speed for the milling tool based on results from said measuring step.

12. The method of claim 11, wherein said determining step comprises determining at least two stable speeds for the milling tool based on results from said measuring step.

13. The method of claim 11, further comprising using the milling tool to cut a piece of material at said at least one stable speed.

14. The method of claim 11, wherein said exciting step comprises a magnet attracting at least one flute on the milling tool as the at least one flute passes by the magnet.

15. The method of claim 11, wherein said measuring step comprises measuring the excitement of the milling tool using a capacitance sensor.

16. The method of claim 11, wherein said measuring step comprises measuring the excitement of the milling tool using a microphone.

17. The method of claim 11, wherein said determining step comprises determining a most stable speed for milling.

18. The method of claim 11, wherein: the milling tool is rotated by a spindle at a spindle speed, said non-cuttingly exciting step employs an excitation force having a power spectrum including a dominant component at the spindle speed and a dominant component at at least one harmonic of the spindle speed, and said determining step comprises determining a most stable spindle speed for milling.

19. A method for determining at least one stable speed for lathe cutting comprising the steps of: rotating a lathe test bar at a plurality of speeds using a lathe spindle;
   non-cuttingly exciting a lathe tool using an excitor mounted in the lathe test bar;
   measuring the excitement of the lathe tool at the plurality of speeds; and
   determining at least one stable speed for the lathe tool based on results from said measuring step.

20. The method of claim 19, wherein said determining step comprises determining at least two stable speeds for the lathe tool.

21. The method of claim 19, further comprising using the lathe tool to cut a piece of material mounted on the lathe spindle and rotated at the at least one stable speed for the lathe tool.

22. The method of claim 19, wherein said exciting step comprises a magnet mounted in the lathe test bar attracting said lathe tool as the magnet passes by the lathe tool.

23. The method of claim 19, wherein said measuring step comprises measuring the excitement of the lathe tool using a capacitance sensor.

24. The method of claim 19, wherein said measuring step comprises measuring the excitement of the lathe tool using a microphone.

25. The method of claim 19, wherein said determining step comprises determining a most stable speed for milling.

26. The method of claim 19, wherein: the lathe tool is rotated by the spindle at a spindle speed, said non-cuttingly exciting step employs an excitation force having a power spectrum including a dominant component at the spindle speed and a dominant component at at least one harmonic of the spindle speed, and said determining step comprises determining a most stable speed for milling.

* * * * *